United States Patent
Chang et al.

(10) Patent No.: US 7,650,525 B1
(45) Date of Patent: Jan. 19, 2010

(54) SPI-4.2 DYNAMIC IMPLEMENTATION WITHOUT ADDITIONAL PHASE LOCKED LOOPS

(75) Inventors: Peter Chang, Fremont, CA (US);
Amrik Bains, Livermore, CA (US);
Ajoy Aswadhati, Cupertino, CA (US);
Edward Wang, Palo Alto, CA (US)

(73) Assignee: Force 10 Networks, Inc., San Jose, CA (US)

( * ) Notice: Subject to any disclaimer, the term of this patent is extended or adjusted under 35 U.S.C. 154(b) by 471 days.

(21) Appl. No.: 11/538,157

(22) Filed: Oct. 3, 2006

Related U.S. Application Data

(60) Provisional application No. 60/723,458, filed on Oct. 4, 2005.

(51) Int. Cl.
*G06F 1/00* (2006.01)
(52) U.S. Cl. .................. 713/500; 713/501; 375/371; 375/354
(58) Field of Classification Search .......... 713/500, 713/503; 375/371, 354
See application file for complete search history.

(56) References Cited

U.S. PATENT DOCUMENTS

| | | | | |
|---|---|---|---|---|
| 6,735,397 | B2* | 5/2004 | Herrity | 398/158 |
| 7,036,037 | B1* | 4/2006 | Paul et al. | 713/401 |
| 7,209,531 | B1* | 4/2007 | Katz et al. | 375/371 |
| 7,301,996 | B1* | 11/2007 | Chi et al. | 375/226 |
| 7,362,837 | B2* | 4/2008 | Jaussi et al. | 375/360 |
| 2002/0009169 | A1* | 1/2002 | Watanabe | 375/371 |
| 2004/0264613 | A1* | 12/2004 | Buchmann et al. | 375/354 |
| 2006/0026449 | A1* | 2/2006 | Chiang | 713/503 |
| 2006/0222017 | A1* | 10/2006 | Quiroga et al. | 370/503 |

OTHER PUBLICATIONS

OIF Optical Internetworking Forum, System Packet Interface Level 4 (SPI-4) Phase 2 Revision 1: OC-192 System Interface for Physical and Link Layer Devices; OIF-SPI-4-02.2, Oct. 15, 2003, 72 pages, SPI-4 Phase 2, www.oiforum.com.

* cited by examiner

*Primary Examiner*—Chun Cao
*Assistant Examiner*—Vincent T Tran
(74) *Attorney, Agent, or Firm*—Robert Schuler

(57) ABSTRACT

A method and apparatus for receiving clocked data signals such as SPI-4.2 data signals is described. In one embodiment, each data signal lane is deskewed with respect to the clock by oversampling the signal on that lane, and considering multiple versions of a data sequence at different temporal offsets to the clock for correct reception of a training sequence. One of the temporal offsets is subsequently selected to provide the received bit sequence for that lane. Other embodiments are described and claimed.

20 Claims, 3 Drawing Sheets

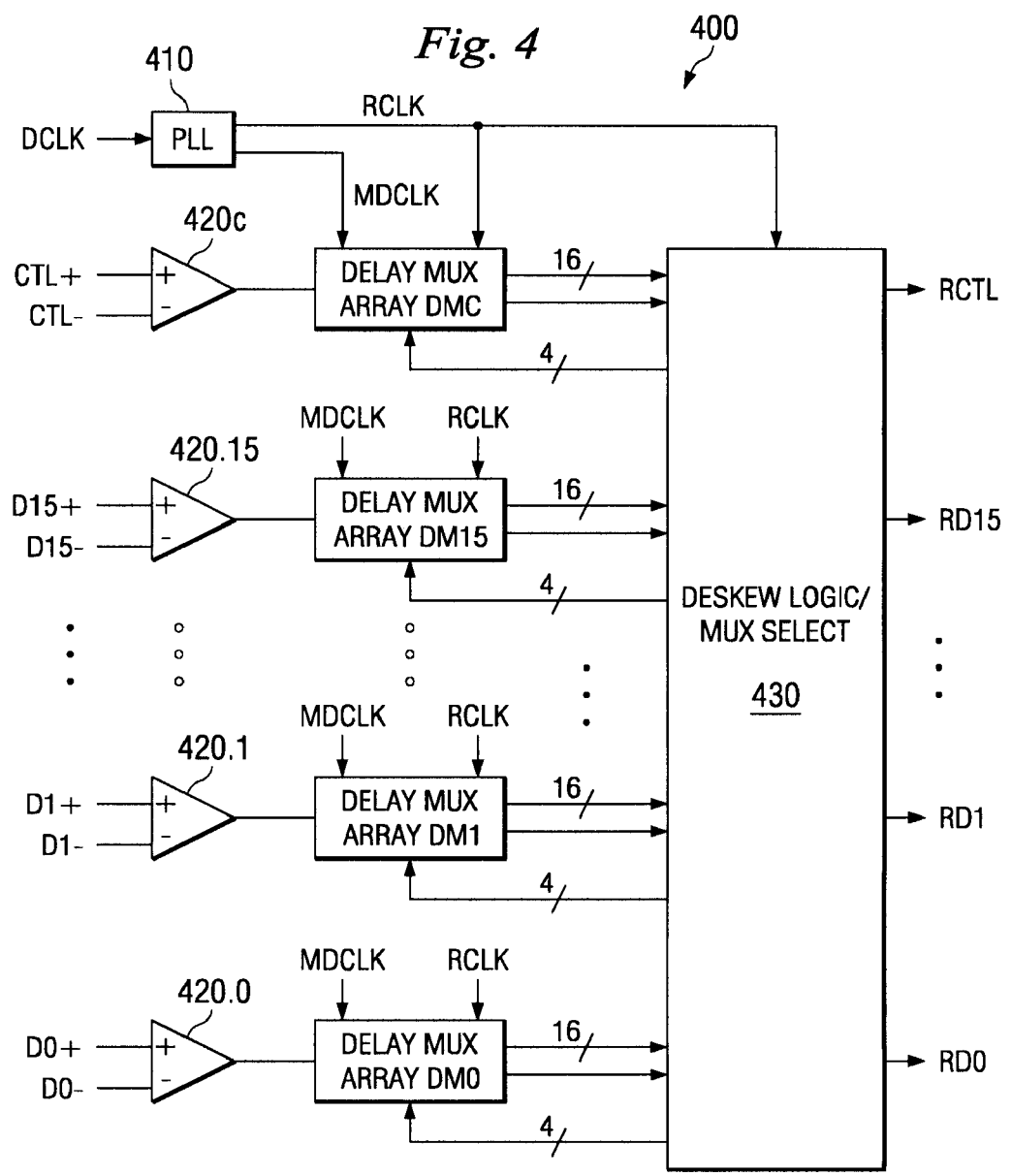

SPI-4.2 DYNAMIC IMPLEMENTATION WITHOUT ADDITIONAL PHASE LOCKED LOOPS

CROSS REFERENCE TO RELATED APPLICATIONS

This application claims priority to U.S. Application Ser. No. 60/723,458 filed Oct. 4, 2005, which is incorporated herein by reference in its entirety.

FIELD OF THE INVENTION

The present disclosure relates generally to network processing devices, and more particularly to a system and method of synchronizing the reception of data on multiple data lanes referenced to a single clock.

BACKGROUND

Many integrated circuits today are connected by printed circuit board high-speed parallel data buses. Due to unequal trace lengths on each data lane and other effects, data launched on each lane at the same time tends to arrive at the receiver at slightly different times. As clock rates increase and pulse widths decrease, the ability to deskew the data lanes at the receiver to compensate for the different lane delays becomes more critical. Deskew logic may be static or dynamic. Dynamic deskew logic typically consists of one phase-locked loop (PLL) or delay-locked loop (DLL) for each data lane, which determines the optimal sample time for each data lane. Implementing DLLs for each lane, however, consumes significant integrated circuit area that could otherwise be used for core circuit functions or removed to reduce circuit size and power requirements.

BRIEF DESCRIPTION OF THE DRAWINGS

Aspects of the present disclosure are best understood from the following detailed description when read with the accompanying figures.

FIG. 4 illustrates the receiver/deskew logic section of an SPI-4.2 receiver according to an embodiment.

DETAILED DESCRIPTION

Figure 1:
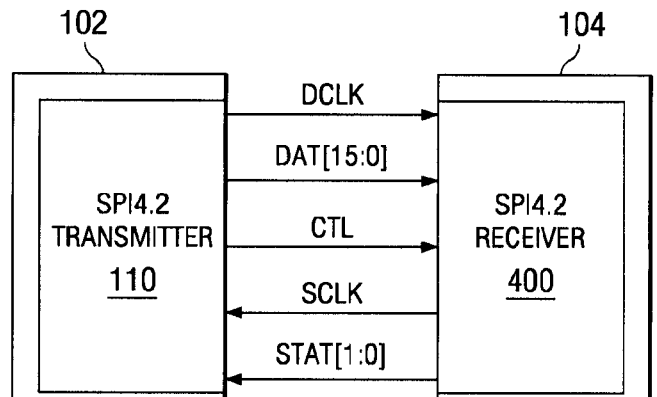
FIG. 1 is a block diagram of an SPI-4.2 transmitter-receiver pair according to an embodiment, connected by an SPI-4.2 bus.

FIG. 1 illustrates a partial system implementation 100 that operates across a bus system connecting two integrated circuits 102 and 104. The bus system connecting circuits 102 and 104 follows the System Packet Interface Level 4 (SPI-4) Phase 2 Revision 1 implementation agreement OIF-SPI-4-02.1, promulgated by the Optical Internetworking Forum, referred to herein as SPI-4.2. Circuit 102 comprises an SPI-4.2-compliant transmitter 110 and other logic (not shown) for supplying data to the transmitter. Circuit 104 comprises an SPI-4.2-compliant receiver 400 and other logic (not shown) for receiving data from the receiver.

An SPI-4.2 bus system connects SPI-4.2 transmitter 110 with SPI-4.2 receiver 400. The bus system comprises a 16-bit-wide data bus DAT[15:0], a control line CTL, a data clock DCLK, a two-bit-wide status bus STAT, and a status clock SCLK. DAT, CTL, and DCLK signals originate at SPI-4.2 transmitter 110 and terminate at SPI-4.2 receiver 400. STAT and SCLK originate at SPI-4.2 receiver 400 and terminate at SPI-4.2 transmitter 110. With respect to the transmitter, DATA and CTL are each driven on a differential pair at double data rate, e.g., one symbol on each pair per transition of data clock DCLK. The transmitter is required to maintain a maximum +/−bit time in bit alignment jitter on each data differential pair with respect to DCLK. The transmitter is also required to maintain a maximum +/−bit time relative skew between the data lines.

Data bus DAT transfers 16 bits of packet data (eight if only one octet remains in a packet) or a control word each clock cycle. When CTL is asserted, DAT contains a control word to be interpreted by SPI-4.2 receiver 400. When CTL is deasserted, DAT contains packet data. Packet data is transmitted in bursts, with a control word immediately preceding and immediately following each data burst. The control word preceding a data burst indicates whether the following data burst is the start of a new packet or a continuation of a previously partially transmitted packet, and also indicates the port address of the following data burst. The control word immediately following a data burst indicates if the data burst contained an end of packet.

The status bus STAT is used to convey flow control information to SPI-4.2 transmitter 110. In a standard SPI-4.2 implementation, the flow control information is related to receive buffers (not shown) associated with the SPI-4.2 receiver. Each receive buffer reports whether it is "starving," "hungry," or "satisfied," depending on buffer fullness. The status bus STAT transmits receive buffer status as a two-bit flow control word, where 00 represents starving, 01 represents hungry, and 10 represents satisfied. STAT repeatedly transmits a definable structure known as a calendar, consisting of a sync word (11), followed by at least one flow control word for each port in a defined sequence, followed by a parity word. The flow control words are updated for each calendar cycle.

Figure 2:
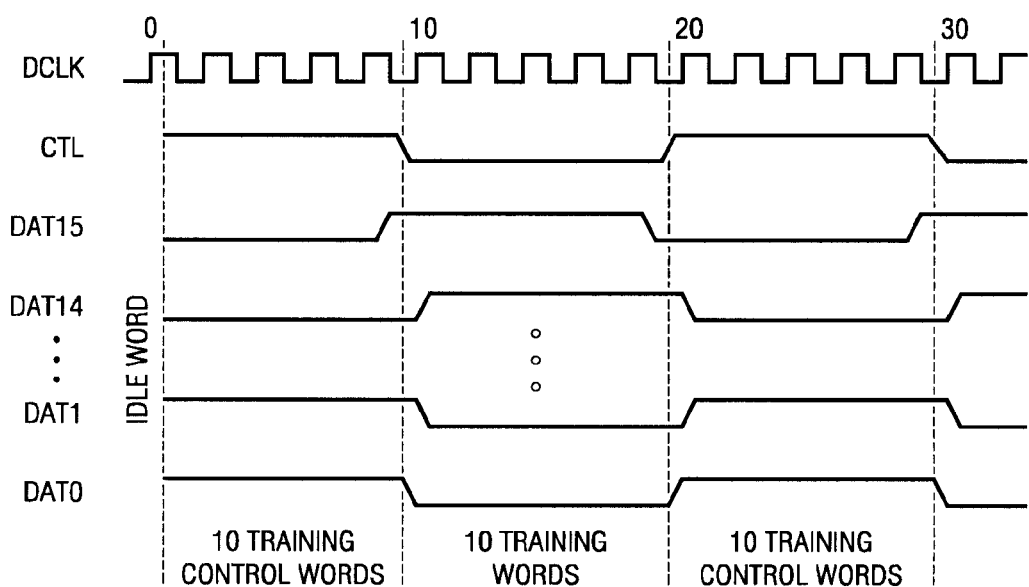
FIG. 2 is a timing diagram for an SPI-4.2 training sequence.

When the SPI-4.2 transmitter and receiver are configured for dynamic deskew operation, the transmitter periodically transmits (e.g., separated by a configurable number of seconds) a training sequence. The training sequence consists of at least one idle control word followed by one or more repetitions of a twenty word training pattern. Each repetition of the training pattern consists of ten repeated training control words followed by ten repeated training data words. The training control words are orthogonal to the training data words, such that each data lane transitions at the end of each set of training control words and each set of training data words. This pattern is illustrated in FIG. 2 for the CTL signal and four of the data lanes. The training control word used herein is 0x0fff, where 0x represents hexadecimal notation. Consequently, the training data word is 0xf000.

Note in FIG. 2 that each lane contains a transition every 10 clock transitions, but the transitions are skewed (the illustrated skew pattern is merely illustrative). The receiver is expected to compensate for the skew during each dynamic training cycle.

Figure 3:
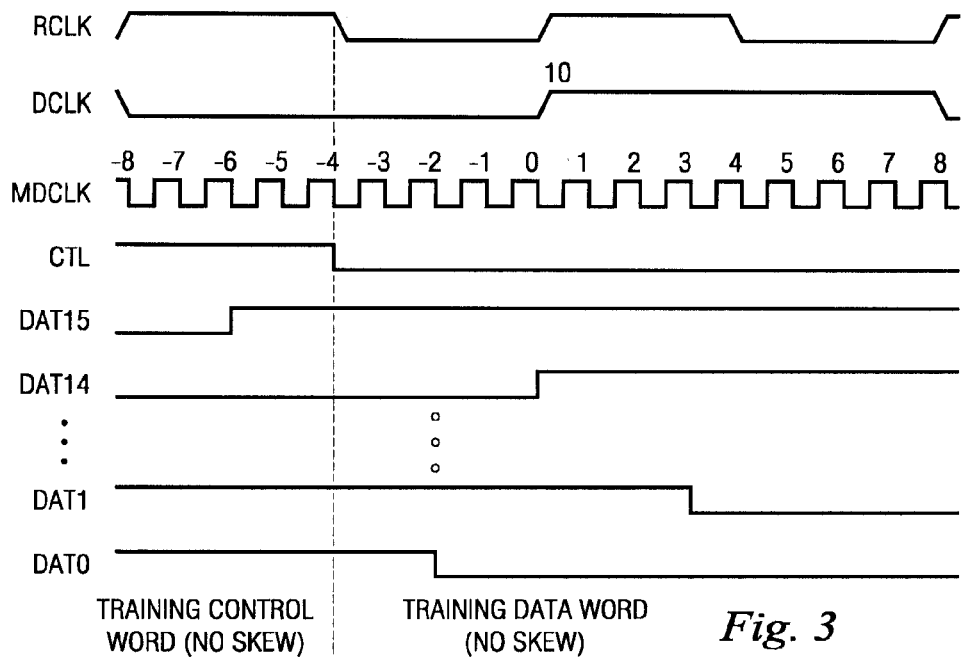
FIG. 3 shows details of one clock period of the timing diagram of FIG. 2.

The described embodiments phase-lock to DCLK and produce a sample clock MDCLK at a multiple of DCLK, e.g., at 16 times the rate of DCLK in one embodiment. FIG. 3 illustrates an expanded view of DCLK in the vicinity of FIG. 2 transition 10, along with the data lane training word transitions from FIG. 2 and MDCLK. At this scale, the relative skews between the training control word-to-training data word transitions are more apparent. CTL is shown transitioning at MDCLK −4, which is the nominal transition time were no skew apparent. DAT15 is shown transitioning at MDCLK −6, DAT14 is shown transitioning at MDCLK 0, DAT1 is shown transitioning at MDCLK 3, and DAT0 is shown transitioning at MDCLK −2. In this scenario, the optimal sample times for CTL, DAT15, DAT14, DAT1, and DAT0 are respective MDCLK values 0, −2, 4, 7, and 2.

FIG. 4 shows a partial block diagram of SPI-4.2 receiver 400, including a PLL 410, differential receivers 420C, 420.15, 420.1, and 420.0, delay MUX arrays DMC, DM15, DM1, and DM0, and a deskew logic/MUX select 430. PLL 410 receives and locks to DCLK to produce MDCLK (at sixteen times the DCLK frequency) and a receive clock RCLK locked to DCLK (at twice the DCLK frequency). Each data lane connects to a differential receiver, i.e., the differential bus pair CTL+, CTL− is input to differential receiver 420C, the differential bus pair D15+, D15− is input to differential receiver 420.15, etc. The output of each of the 17 differential receivers is supplied to a corresponding delay MUX array. Each delay MUX array communicates with deskew logic/MUX select 430, as will be explained further below. Finally, deskew logic/MUX select 430 outputs the received deskewed signals RCTL, RD15, . . . , RD1, RD0 for use in other portions of receiver 400 (not shown).

Figure 5:
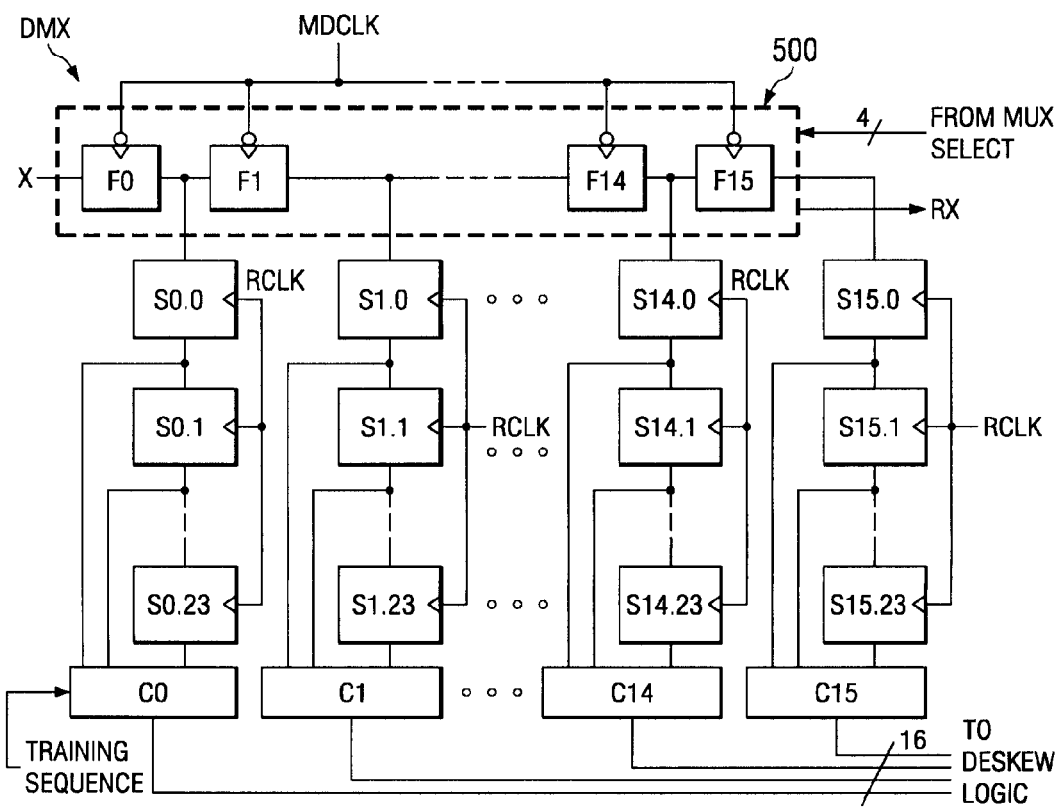
FIG. 5 contains a block diagram for a delay MUX array according to an embodiment.

FIG. 5 illustrates one embodiment of a delay MUX array DMx. The delay MUX array comprises a delay MUX 500 comprising 16 serial delay registers F0 to F15, a group of 24 serial shift registers Sy.0 to Sy.23 coupled to the output of each serial delay register Fy, and a multi-bit comparator Cy coupled to Sy.0 to Sy.23 (or a subset thereof). The operation of each element of delay MUX array DMx will be described in turn.

Delay MUX 500 receives a signal x, which is the output of one of the differential receivers 420.x shown in FIG. 4. Delay register F0 loads the current value of signal x on each MDCLK negative edge, and thus loads 16 consecutive samples of signal x for each RCLK period. Delay register F1 loads the previous value of register F0 at the same time, and so on, such that delay MUX 500 holds the last 16 MDCLK samples of signal x, one of which will be closest to the desired sample time midway between consecutive data setup times. MUX select 430 sends a four-bit MUX address to delay MUX 500, indicating which of the 16 delay register outputs it has selected as the output value Rx. Each delay MUX array is supplied with its own MUX address selected to appropriately deskew that data lane.

The output of each delay register Fy is supplied to the head of a serial shift register chain Sy.0 . . . Sy.23. Each shift register in chain Sy.0 . . . Sy.23 is clocked with RCLK, and thus samples Fy each sixteen MDCLK samples. At any time, Sy.0 . . . Sy.23 contains a "snapshot" of the content of delay register Fy at each of the last 24 RCLK transitions. Thus considering all groups of serial shift registers, sixteen contesting "snapshots" of 24 values each are held.

Comparators C0 . . . C15 each compare one of the snapshots to the appropriate bits of a training sequence. For instance, if x is the output of differential receiver 420.0, the training bit sequence can be selected as 11111100000000001111111, corresponding to DCLK transitions 3 to 26 in FIG. 2 for DAT0. As the "snapshots" step through the training sequence during a training period, each comparator looks for this bit sequence in its group of shift registers. When (and if) the bit sequence is found, the comparator that found the sequence asserts a comparison output signal to deskew logic 430.

Note that in general some shift register groups will not match the sequence because they sample too near (or on the wrong side of) the setup period, but in general some band of comparators will all signal a match. The deskew logic finds the range of comparators that indicated a match, and selects the mean of this range as the desired address for the MUX select signal. Thus continuing with the example above for DAT0, comparators C7 to C11 could all indicate a training sequence match, causing deskew logic 430 to select C9 (and therefore F9) as its preferred delay MUX output for RD0. A delay MUX address of 1001 would be supplied to delay MUX array DM0 to select the output of F9 for use as RD0.

The above-described mechanism can be used once to set the deskew pattern for the bit lanes, or can be used dynamically to periodically adjust for changing skew/jitter patterns.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the claims. It should be noted that the names given to modules and components of the system in the detailed description and claims are merely used to identified the modules and components for the sake of clarity and brevity and should not be used to limit or define the functionality or capability thereof unless explicitly described herein.

What is claimed is:

1. A method of deskewing a data lane, the method comprising:
   receiving a clock signal at a clock rate and a data signal driven at a data rate having an integral relationship to the clock rate;
   sampling the data signal at a sample rate that is an integral multiple of the data rate;
   for each of multiple temporal offsets, each offset from the clock signal by a corresponding offset based at least in part on an integer number of samples taken at the sample rate, comparing an expected bit sequence to a sequence of data signal samples taken at the corresponding offset, and offset from each other by a time period equal to the data rate; and
   selecting, based on the comparison performed for each of the multiple temporal offsets, one of the temporal offsets as a data lane temporal offset for receiving the data signal.

2. The method of claim 1, wherein selecting one of the temporal offsets comprises selecting, from among a group of the temporal offsets for which the expected bit sequence matches the sequence of data signal samples taken at those offsets, one of the group as an offset for the data lane.

3. The method of claim 2, wherein selecting one of the group as an offset comprises selecting a range of temporal offsets that includes the group, and selecting the mean of the range as the data lane temporal offset.

4. The method of claim 1, wherein comparing an expected bit sequence to a sequence of data signal samples taken at each of multiple offsets comprises feeding the sequence of data signals taken at each offset to a corresponding comparator for that offset, each such comparator outputting a result of the comparison for its corresponding offset.

5. The method of claim 4, further comprising shifting samples taken at each given offset through a corresponding serial shift register chain shifted at the data rate, and supplying the output of the shift registers in the serial shift register chain to the corresponding comparator as the sequence of data signal samples.

6. The method of claim 5, further comprising supplying the samples of the data signal taken at the sample rate to an input delay register of a delay multiplexer array comprising a plurality of serial delay registers including the input delay register, each delay register corresponding to one of the temporal offsets, and clocking the samples through the delay multiplexer array at the sample rate.

7. The method of claim 6, wherein each serial shift register chain receives at an input the output of a corresponding one of the serial delay registers.

8. The method of claim 6, wherein the delay multiplexer array receives a multiplexer select address indicating one of the serial delay registers corresponding to the selected data lane temporal offset, the delay multiplexer array supplying the output of the indicated serial delay register as the received data signal.

9. The method of claim 1, wherein the method is performed concurrently for each of several data lanes to select data lane temporal offsets for each lane.

10. The method of claim 9, further comprising detecting a recurring training sequence on the several data lanes, and repeating the method when the training sequence is detected.

11. A data receiver comprising:
a clock generator to receive a clock signal at a clock rate and generate a data clock at a data rate having an integral relationship to the clock rate, and a sample clock at a sample rate that is an integral multiple of the data rate; and
a first delay multiplexer array comprising a plurality of serial delay registers including an input delay register to receive a data signal, the delay multiplexer shifting samples of the data signal, taken at the sample rate, through the serial delay register at a shift rate equal to the sample rate, the delay multiplexer array further comprising a multiplexer select input to select one of the serial delay registers to provide samples of the data signal at the data rate, based on the data clock.

12. The data receiver of claim 11, wherein the clock generator comprises a phase-locked loop locked to the clock signal.

13. The data receiver of claim 11, further comprising a plurality of additional delay multiplexer arrays similar to the first delay multiplexer array, each delay multiplexer array receiving a corresponding one of a plurality of input data signals and supplying samples of that corresponding data signals at the data rate, based on the data clock and on a multiplexer select input to select one of the serial delay registers to provide the supplied samples.

14. The data receiver of claim 13, further comprising deskew logic to provide the multiplexer select inputs to the delay multiplexer arrays.

15. The data receiver of claim 14, wherein each delay multiplexer array provides comparison signals to the deskew logic, the comparison signals representing comparisons of a training sequence to a sequence of samples taken at the data rate and at a plurality of offsets to the data clock.

16. The data receiver of claim 15, wherein the deskew logic chooses the multiplexer select input for each delay multiplexer array to correspond to a comparison at an offset for which the sequence of samples matches the training sequence.

17. The data receiver of claim 16, wherein when multiple offsets produce a sequence of samples that match the training sequence, the deskew logic calculates a range of the multiple offsets and chooses the multiplexer select input to correspond to the mean of this range.

18. The data receiver of claim 15, wherein each delay multiplexer array comprises a plurality of comparators, each outputting a comparison signal for a corresponding one of the offsets.

19. The data receiver of claim 18, wherein each delay multiplexer array further comprises a plurality of serial shift register chains, each chain receiving samples at the data rate from a corresponding one of the serial delay registers and shifting the samples through the chain at the data rate, each chain supplying output from the serial shift registers in the chain to a corresponding one of the comparators.

20. The data receiver of claim 13, wherein the receiver receives the clock signal and the input data signals as a DCLK and sixteen-lane DAT signals of a bus compliant with System Packet Interface Level 4 Phase 2.

* * * * *